(12) United States Patent
Milov et al.

(10) Patent No.: US 8,401,221 B2
(45) Date of Patent: Mar. 19, 2013

(54) COGNITIVE CONTROL FRAMEWORK FOR AUTOMATIC CONTROL OF APPLICATION PROGRAMS EXPOSURE A GRAPHICAL USER INTERFACE

(75) Inventors: Denis S. Milov, Kirishi (RU); Julia G. Fedorova, Nizhny Novgorod (RU); Eugene V. Tcipnjatov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1354 days.

(21) Appl. No.: 10/576,170

(22) PCT Filed: Jun. 10, 2005

(86) PCT No.: PCT/RU2005/000325
§ 371 (c)(1),
(2), (4) Date: Apr. 18, 2006

(87) PCT Pub. No.: WO2006/132564
PCT Pub. Date: Dec. 14, 2006

(65) Prior Publication Data
US 2009/0103769 A1    Apr. 23, 2009

(51) Int. Cl.
*G06K 9/00*    (2006.01)
(52) U.S. Cl. ........ 382/100; 382/103; 382/155; 715/704; 715/716; 386/282
(58) Field of Classification Search ............. 382/100; 715/704
See application file for complete search history.

(56) References Cited

U.S. PATENT DOCUMENTS

| | | | |
|---|---|---|---|
| 5,335,342 A | 8/1994 | Pope et al. | |
| 5,600,789 A | 2/1997 | Parker et al. | |
| 5,715,108 A * | 2/1998 | Yoo | 360/62 |
| 5,758,062 A | 5/1998 | McMahon et al. | |
| 6,203,425 B1 * | 3/2001 | Hayashi | 463/1 |

(Continued)

FOREIGN PATENT DOCUMENTS

| WO | 20031038550 A2 | 5/2003 |
|---|---|---|
| WO | 2006/132564 A1 | 12/2006 |

(Continued)

OTHER PUBLICATIONS

Redstone Software, Inc.,"Software Automation and Testing," Jun. 27, 2004, XP002383091, pp. 1-19.*

(Continued)

*Primary Examiner* — John Lee
(74) *Attorney, Agent, or Firm* — Trop, Pruner & Hu, P.C.

(57) ABSTRACT

A cognitive control framework system for automatically controlling execution of an application program having a graphical user interface includes a recording component, an execution scenario script, and a playback component. The recording component is adapted to capture user input data and images displayed by the graphical user interface during a recording phase of execution of the application program, and to analyze the captured user input data and displayed images to generate an execution scenario (script) during the recording phase. The execution scenario may be written in a selected high level language (e.g., XML). The playback component is adapted to generate simulated user input data based on the execution scenario during a playback phase of execution of the application program.

25 Claims, 8 Drawing Sheets

U.S. PATENT DOCUMENTS

| | | | | |
|---|---|---|---|---|
| 7,165,191 | B1 | 1/2007 | Vakrat | |
| 7,478,182 | B2 * | 1/2009 | Schweig | 710/73 |
| 7,617,299 | B2 * | 11/2009 | Yoshimine | 709/219 |
| 7,644,368 | B2 | 1/2010 | Pins | |
| 7,653,896 | B2 | 1/2010 | Herdeg, III | |
| 2002/0156829 | A1 * | 10/2002 | Yoshimine | 709/201 |
| 2003/0023952 | A1 | 1/2003 | Harmon, Jr. | |
| 2003/0172374 | A1 * | 9/2003 | Vinson et al. | 725/9 |
| 2003/0236775 | A1 | 12/2003 | Patterson | |
| 2004/0194065 | A1 | 9/2004 | McGrath et al. | |
| 2005/0021289 | A1 | 1/2005 | Robertson et al. | |
| 2005/0177772 | A1 | 8/2005 | Derks et al. | |
| 2008/0294985 | A1 | 11/2008 | Milov | |
| 2010/0138360 | A1 * | 6/2010 | Cutler et al. | 705/36 R |

FOREIGN PATENT DOCUMENTS

WO      20071055612 A1      5/2007

OTHER PUBLICATIONS

"Software Automation & Testing", Jun. 27, 2004 pp. 1-19, XP002383091 [retreived] May 29, 2006, <http://web.archive.org/web/20040627105104/http://www.redstonesoftware.com/EggplantOverview/Eggplant+Overview.pdf>.

"AcuTest", Jul. 11, 2004 XP002383092 [retrevied] May 29, 2006, <http://web.archive.org/web/20040711080728/http://www.tevron.com/acutest.asp>.

"Eggplant Tutorial, for Use with a MAC OS X System-Under-Test, Eggplant Version 3.1", Redstone Software, Inc. XP-002397141,(Jun. 3, 2005),1-18.

"Software Automation and Testing", Redstone Software, Inc. XP 002383091,(Jun. 27, 2004),1-19.

Herron, David, "Accessibility for Test Automation", David Herron's Blog, XP-002388052.,(Jul. 19, 2005),1-3.

International Search Report and Written Opinion received for PCT Patent Application No. PCT/RU2005/000325, mailed on Jun. 19, 2006, 11 pages.

Ostrand, "A Visual Test Development Environment for GUI Systems," Siemens Corporate Research, pp. 82-92, XP-000740949, 1998.

International Preliminary Report on Patentability for PCT Patent Application No. PCT/RU20051000559, mailed May 22, 2008, 8 pages.

* cited by examiner

COGNITIVE CONTROL FRAMEWORK FOR AUTOMATIC CONTROL OF APPLICATION PROGRAMS EXPOSURE A GRAPHICAL USER INTERFACE

CROSS-REFERENCE TO RELATED APPLICATION

This application is a National Phase application of, and claims priority to, International Application No. PCT/RU2005/000325, filed Jun. 10, 2005, entitled "A COGNITIVE CONTROL FRAMEWORK FOR AUTOMATIC CONTROL OF APPLICATION PROGRAMS EXPOSING A GRAPHICAL USER INTERFACE".

BACKGROUND

1. Field

The present invention relates generally to automatic control of software application programs and image analysis and, more specifically, to analyzing graphical user interface (GUI) images displayed by an application program for automatic control of subsequent execution of the application program.

2. Description

Typical application program analysis systems capture keyboard input data and mouse input data entered by a user. The captured input data may then be used to replay the application program. These systems rely on playback of the application program on the same computer system used to capture the input data, and thus are not portable.

Some existing application program analysis systems use image recognition techniques that are dependent on screen resolution and/or drawing schemes, or have strong dependencies to the underlying operating system (OS) being used. Such systems typically rely on dependencies such as Windows32 or X-Windows application programming interfaces (APIs). This limits their portability and usefulness.

Hence, better techniques for analyzing the GUIs of application programs are desired.

BRIEF DESCRIPTION OF THE DRAWINGS

The features and advantages of the present invention will become apparent from the following detailed description of the present invention in which.

DETAILED DESCRIPTION

An embodiment of the present invention is a cognitive control framework (CCF) for automatic control of software application programs that have a graphical user interface (GUI). Examples of such applications programs may be executed on current operating systems such as Microsoft Windows® and Linux, for example, as well as other operating systems. An embodiment of the present invention creates a system simulating a human user interacting with the GUI of the application program and using the GUI for automatic control of the application program without relying on dependencies such as specific graphical libraries, windowing systems, or visual controls interfaces or implementations. The CCF comprises an easy-to-use cross-platform tool useful for GUI testing based on pattern recognition. By being independent of any OS-specific controls and graphical libraries, the CCF may be used for interaction with non-standard graphical interfaces as well as with well known ones. The system provides for recording any kind of keyboard and mouse actions the user performs while working with the GUI of the application program and then providing playback of the recorded scenario. In the present invention, image analysis of captured display data (such as screen shots, for example) is performed to identify actions of the application program corresponding to user input data. These actions and input data may be stored for use in future playback of the same user scenario for automatically interacting with the application program.

Embodiments of the present invention comprise operating on two phases: a recording phase and a playback phase. During the recording phase, the system is "learning" how to control the application program. The system registers and captures input actions supplied by the user (such as a mouse click or entering of text via a keyboard, for example) and display data (e.g. screen shots) of images displayed by the application program in response to those actions. The user actions, the time interval between actions, resulting display data of the GUI of the application program, and possibly other data and/or commands form an execution scenario. By following the execution scenario, during the playback phase the system provides the same but fully automatic execution of the application program (simulating the user control but without the real presence of the user). Automatic execution is made possible due to a plurality of image analysis and structural techniques applied correspondingly to images during the recording and playback phases.

Figure 1:
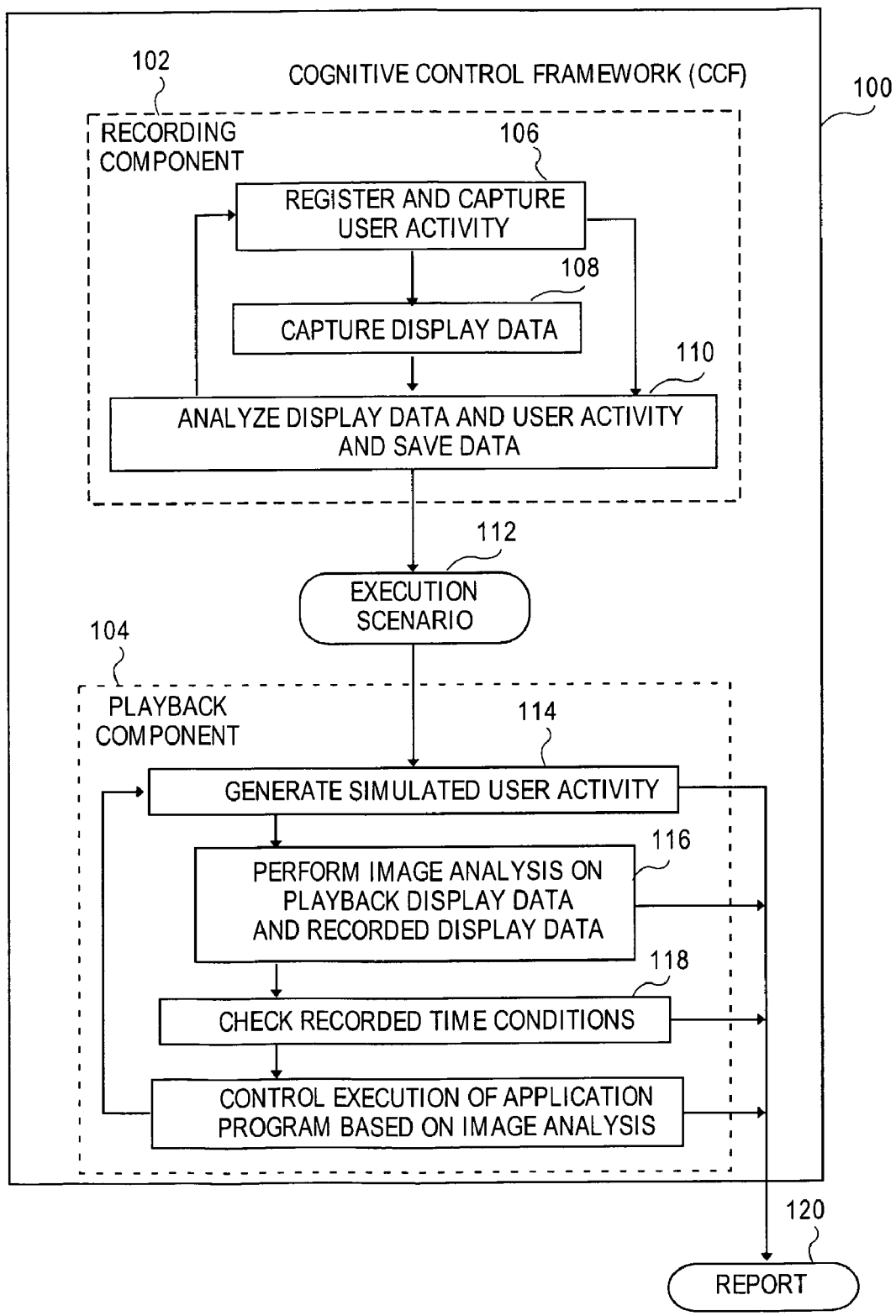
FIG. 1 is a diagram of a cognitive control framework system according to an embodiment of the present invention.

FIG. 1 is a diagram of a cognitive control framework (CCF) system 100 according to an embodiment of the present invention. FIG. 1 shows two components, recording component 102 and playback component 104. These components may be implemented in software, firmware, or hardware, or a combination of software, firmware and hardware. In the recording component, the CCF system registers and captures user input activity at block 106. For example, the user may make input choices over time to an application program being executed by a computer system using a mouse, keyboard, or other input device. This input data is captured and stored by the CCF system. Next, at block 108, the display data may be captured (e.g. screen shots are taken). In one embodiment, the display data may captured only when user input has been received by the application program. The display data is also saved. At block 110, the data captured during blocks 106 and 108 may be analyzed and saved. These processes may be repeated a plurality of times. The result of the processing of the recording component comprises an execution scenario 112 for the application program being processed by the system. In one embodiment, the execution scenario comprises a script containing Extended Markup Language (XML) tags. The execution scenario describes a sequence of user inputs to the application program, corresponding display images on a GUI of the application program, and commands directing the application program to perform some actions.

At a later point in time, during the playback phase the playback component 104 may be initiated. At block 114, simulated user activity may be generated based on the execution scenario. That is, saved inputs and commands from the execution scenario may be input to the application program for purposes of automatic control using the CCF system. While the application program processes this data, display data may be changed on the display as a result. At block 116, the CCF system performs image analysis on the playback display data currently being shown as a result of application program processing and the display data captured during the recording phase. At block 118, recorded time conditions may be checked to take into account possible variations in playback. For example, the time when an object appears may be within a time interval based on a recorded time. For example, in one embodiment a lower bound time (time to start the search) may be extracted from the saved data in the execution scenario and an upper bound time may be the lower bound time plus 10%, or some other appropriate value. Processing of blocks 114, 116, and 118 each result in data being stored in report 120. At block 119, the CCF system controls execution of the application program based on the results of the image analysis. Blocks 114, 116 and 118 may be repeated for each in a sequence of user input data items from the execution scenario.

The time interval between sequential actions is a part of the captured execution scenario. However, while following the execution scenario in the playback phase, one should not expect that the time interval between any two actions at playback will be equal to the time interval between the same two actions during the recording phase. There are a number of objective reasons why this interval could be different on playback than during recording. For example, the application program during recording and playback may be executed on different computer systems having different processor speeds, or an application program could require different times for the same actions during playback due to accesses of external data or resources. This indicates a requirement in the CCF system to handle flexible time conditions, e.g. handle some tolerance for the time interval between actions during the playback phase. During that time interval at playback, the system checks the recorded display data to the playback display data several times to determine if the playback display data is substantially similar to the recorded display data. A finding that the two are substantially similar indicates that a previous user action has completed and the system can progress to the next action in the execution scenario. This activity may be similar to the situation where the user is interacting with the application program and pauses periodically to view the display to determine if the expected visible changes to the display have been made by the application program based on previous actions. If so, then a new action may be performed. If at the end of a higher bound of the time interval the application program has not produced an image on the display that the CCF system expected according to the execution scenario, then the CCF system may interrupt the playback of the execution scenario and generate an error report describing how the execution scenario has not been followed. In one embodiment, the scenario may be corrected and the CCF system may be required to use other branches to continue.

The cognitive control framework (CCF) system of embodiments of the present invention performs image analysis and object detection processing on display data from the GUI of the application program. The CCF system includes comparing an image captured during a recording phase (called IR) to the corresponding image captured during the playback phase (called IP). One task of the system is to detect an object in the IR to which the user applied an action, find the corresponding object in the IP, and continue progress on the execution path of the execution scenario by applying the action to the detected object. These steps may be repeated for multiple objects within an image, and may be repeated across multiple pairs of IRs and IPs over time. An object that the user has applied an action to may be called an "object of action." Absence in the IP of the object of action corresponding to the one found at IR means that one should capture the IP again at a later time and try to find the object of action again. Finally, either an object of action may be found in the IP or execution of the scenario may be halted and a report generated describing how the wrong state was achieved and the scenario may not be continued. In embodiments of the present invention, this detection of objects of action may be done in real time during the playback phase, progressing from one action to another. Thus, the image analysis process employed must have good performance so as to introduce only a minimal disturbance to the time conditions at playback.

The CCF system of embodiments of the present invention comprises an image analysis and detecting process. Such a process has at least two requirements. First, the process should be able to overcome some variations in the captured images such as different color scheme, fonts, and the layout and state of the visual elements. In one embodiment, comparison constraints for checking these items (color scheme, fonts, etc.) may be set to specified parameters in accordance with specific needs. Overcoming these variations is desirable because recording and playback might be executed in different operating environments such as different screen resolutions, different visual schemes, different window layouts, and so on. Additionally, there could be insignificant differences in corresponding IR (usually captured after an action was applied to an object of interest) and IP pairs (captured after a previous action was completed). Second, the implementation of the image analysis and object detection process should be fast enough to introduce only minimal disturbances and delay of application execution during playback.

By processing captured images, the system builds descriptions of the images in terms of the objects presented on them. Each display object may be represented by its contour and a plurality of properties. Table I enumerates some possible contour properties for use in the present invention. In other embodiments, other properties may also be used.

TABLE I

Contour properties

| Property | Description |
| --- | --- |
| Location | Coordinates (on the image) of the contour center. |
| Image size | Characteristic contour size. In case of rectangular contours they are just vertical and horizontal sizes. For controls of more complicated shape, another format may be used. |
| Layout | Connection to other contours that lay in proximity to its boundaries/layout pattern of this contour. |
| Content Type | Indicates what is inside of the contour: text, image or a combination. |
| Content | If the content type is text, then a text string; if image (e.g. icon), then the image. |

Figure 2:
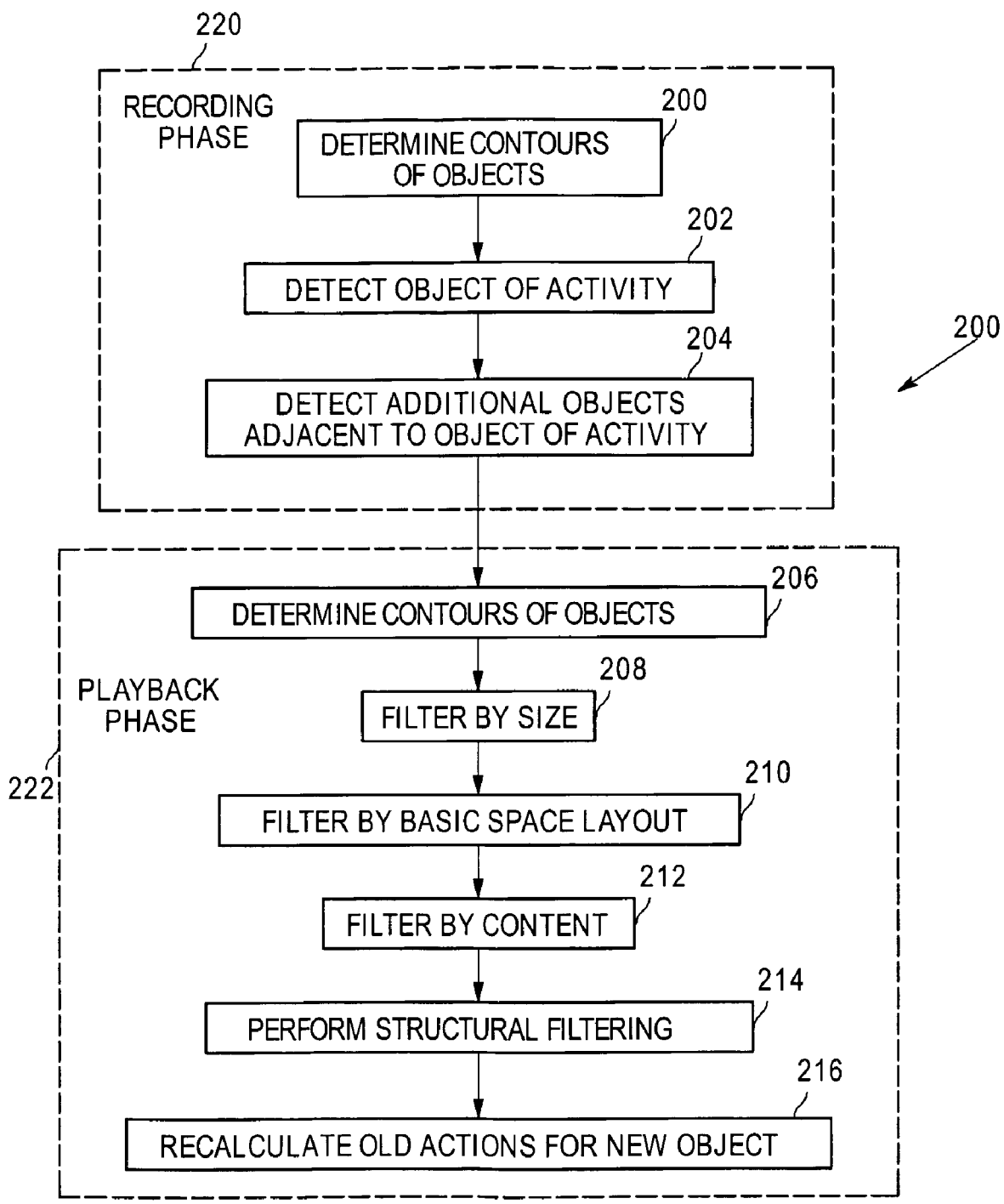
FIG. 2 is a flow diagram illustrating processing in a cognitive control framework according to an embodiment of the present invention.

FIG. 2 is a flow diagram illustrating processing of a CCF system according to an embodiment of the present invention. During the recording phase 220 handled by recording component 102, at block 200 the system determines contours of objects in the IR. At block 202, the system detects a current object of activity. At block 204, the system detects additional objects adjacent to the current object of activity in the IR. These steps (200, 202, and 204) may be repeated over time for all objects of activity during execution of the application program in the recording phase.

Next, during the playback phase 222 handled by playback component 104, at block 206 the CCF system determines the contours of objects in the IP. At block 208, the CCF system filters contours by size to determine contours that may become hypotheses for active objects and contours that connect them. At block 210, the CCF system filters the objects by basic space layout in the IP to determine subsets of hypotheses for active and additional objects. For example, filtering criteria for space layout may include tables, wizards, and menus. In one embodiment, the user (or CCF schema with a cascade search) could set both strict (e.g. "as is") and fuzzy (e.g. "object could be near each other") conditions. At block 212, the CCF system filters the objects by content to produce further subsets of hypotheses for active and additional objects. For example, the filtering criteria by content may include images and text. Moreover, in one embodiment, the user (or CCF schema with cascade search) could set both strict (e.g. "image should have difference in a few points and text should have minimal differences on a base of Levenstein distance") and fuzzy (e.g. "image could be stable to highlighting and have insignificant structural changes and text could have noticeable differences on a base of Levenstein distance without consideration of digits") conditions. At block 214, the CCF system performs structural filtering of the objects to produce a best hypothesis for active objects.

Finally, at block 216, the CCF system recalculates old actions for a new object by applying the action according to the execution scenario. For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

Table II shows the input data and output of the image analysis process for FIG. 2.

TABLE II

Image Analysis Processing

| Step | Input Data | Result | Input parameters and Description |
|---|---|---|---|
| Working with image from recording phase (IR) by recording component | | | |
| 1. Contouring | Image from recoding (IR) | Contours | Thresholds, distances between objects (with some tolerance). Intel ® OpenCV library used in one embodiment. |
| 2. Detecting object of activity | Image IR and contours from previous step. | Contour representing object of activity | Typical object size (with tolerance) for object of action. Optical character recognition (OCR) and fuzzy text comparison, e.g. with Levenshtein distance. |
| 3. Detecting additional objects around object of activity | Image IR, contours and active objects. | Additional objects and their layout against object of action | Typical object size (with tolerance) for additional objects. Structural analysis, e.g. "criss-cross" rules. |
| Working with image from playback phase (IP) by playback component | | | |
| 4. Contouring | Image from playback (IP) | Contours | Thresholds, distances between objects (with some tolerance). Intel ® OpenCV library used in one embodiment. |
| 5. Filtering by size | Contours from previous step | Contours that become hypotheses for active object and contours connected with them | Mean object size (with tolerance) based on active object characteristics evaluated at Step 2. Typical object size (with tolerance) for additional objects. Filtering out contours that don't fit into input size limits. |
| 6. Filtering by basic space layout | Subsets of hypotheses for active and additional objects | Decreased subsets of hypotheses for active and additional objects | Fuzzy distance filtration. Fuzzy filtration for directions. |
| 7. Filtering by content | Subsets of hypotheses for active and additional objects | Decreased subsets of hypotheses for active and additional objects | OCR and fuzzy text comparison, e.g. with Levenshtein distance. Fuzzy image comparison. Using "fuzzy content type" method for filtration. |

TABLE II-continued

Image Analysis Processing

| Step | Input Data | Result | Input parameters and Description |
|---|---|---|---|
| 8. Structural filtering | Subsets of hypotheses for active and additional objects | The best hypothesis for active objects. | Method based on fuzzy triple links both between objects from IR and their hypotheses from IP. It's stable to additional objects which don't have strong structural links with active object. Moreover, one can use the result of this method to choose the best hypotheses for active objects. Some other methods, e.g. Hough transformation may also be used here. |
| 9. Recalculating old actions for new object | Object of action | Applied the action according to the execution scenario | Recalculating action coordinates in IP (playback image) coordinate system |

During filtering at each step there is an evaluation of specific contour properties (as required for a specific filter). This filtering pipeline is designed in such a way that the most time consuming evaluation steps are shifted to later in the processing pipeline when the number of contours (hypotheses) is smaller. By using this approach, the overall computational cost may be decreased, thereby helping to ensure good performance of the system.

It is useful to maintain a compromise in order to make sure that the system does not filter out some contours in the early steps that may be later determined to be either a hypothesis of an object of activity or objects connected with an object of activity. In this regard, predefined input parameters may be set to broad limits that requires spending a little more time on processing of additional contours (hypotheses), but ensure that the system has not dropped important contours.

Example pseudo-code for one embodiment of the present invention is shown in Table III.

TABLE III

Pseudo Code Example

```
BEGIN CCF
<<<<<<<< Recording >>>>>>>>
LOOP /*recording, e.g. till a special key combination */
    Wait on user action /*mouse, keyboard, it's possible to set something else*/
    Hook and save screenshot /*e.g. <Screenshot fileName="1.png"/>*/
    Save time interval from the previous action /*e.g. <Sleep duration="2000"/>*/
    Save information about user action
/*e.g. <Mouse action="RightClick" x="100" y="200"/>*/
END LOOP /*recording, e.g. till a special key combination*/
EXIT
<<<<<<<< Post-processing >>>>>>>
Process saved data into a more compact form. It's possible for the user to change it for
his or her needs.
<<<<<<<< Playback >>>>>>
LOOP /*till the end of saved data*/
    Load time interval and wait in accordance with it.
    IF [actions depend on coordinates on the screen] /*e.g. mouse click*/ THEN
        Load saved screenshot
        Detect object of action /*e.g. button*/, nearest structure-layout /*e.g. menu items
around button*/ and other useful info on saved screenshot
        TimeConditions_label: Hook the current screenshot
        Use image processing to find the corresponding object on the current screenshot /*it's
possible to require more information from saved screenshot during search*/
            IF [Object not found] THEN
                IF [Check time condition] /*e.g. it's possible to repeat search 3 times with 1000-
msec step, for example*/ THEN
                    GOTO TimeConditions_label
                ELSE
                    EXIT with error code /*moreover, it's possible to send corresponding report to log-
file*/
                END IF
            ELSE
                Recalculate actions on a base of new found objects /*e.g. recalculate new
coordinates for mouse click*/
            END IF
    END IF
    Produce actions /*it could be changed actions after image processing; moreover, it's
possible to finish execution in case of wrong situations during actions*/
```

TABLE III-continued

Pseudo Code Example

END LOOP /*till the end of saved data*/
EXIT
END CCF

---

Figure 3:
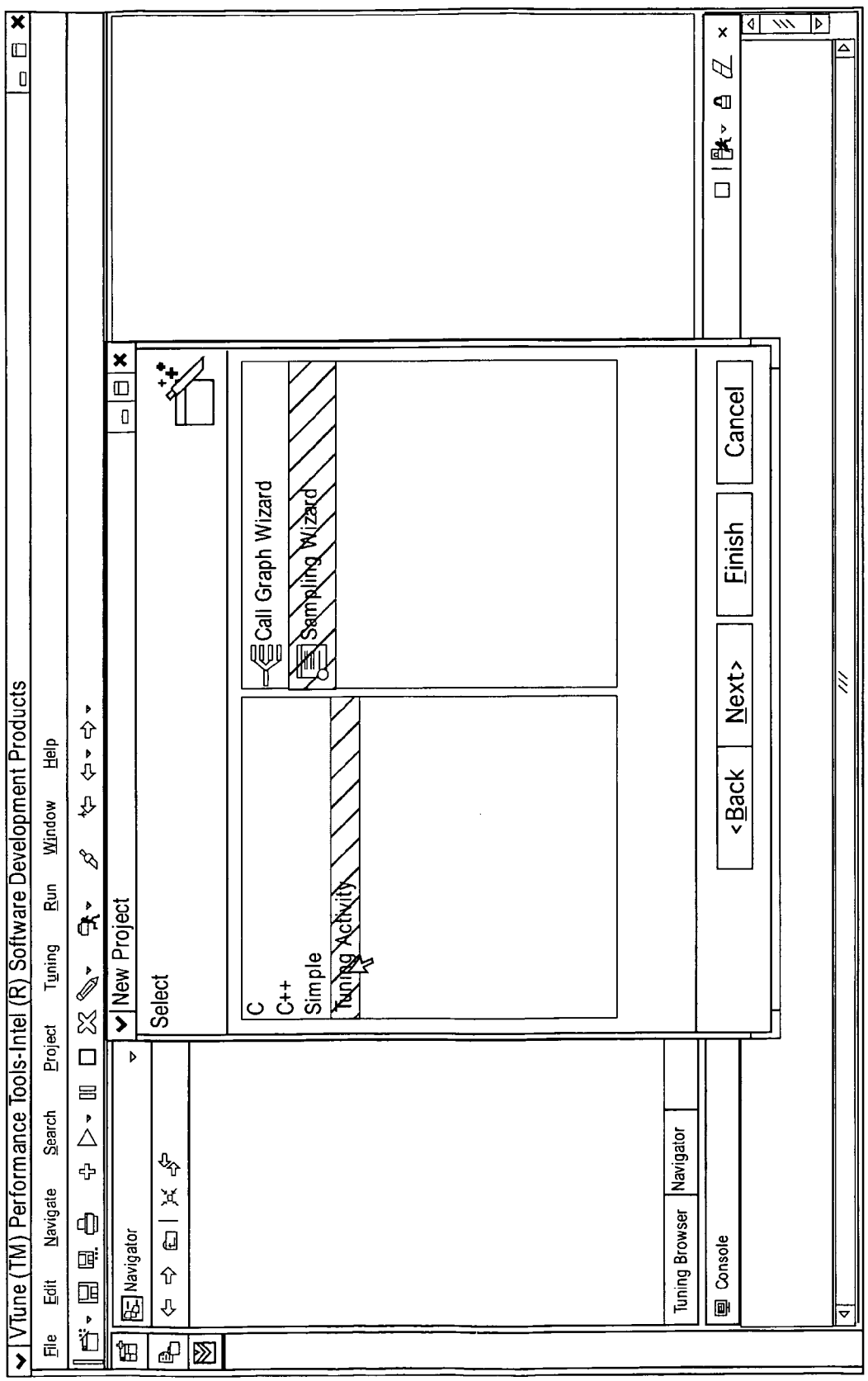
FIG. 3 is an example display of the GUI of an application program captured and saved during a recording phase.
Figure 4:
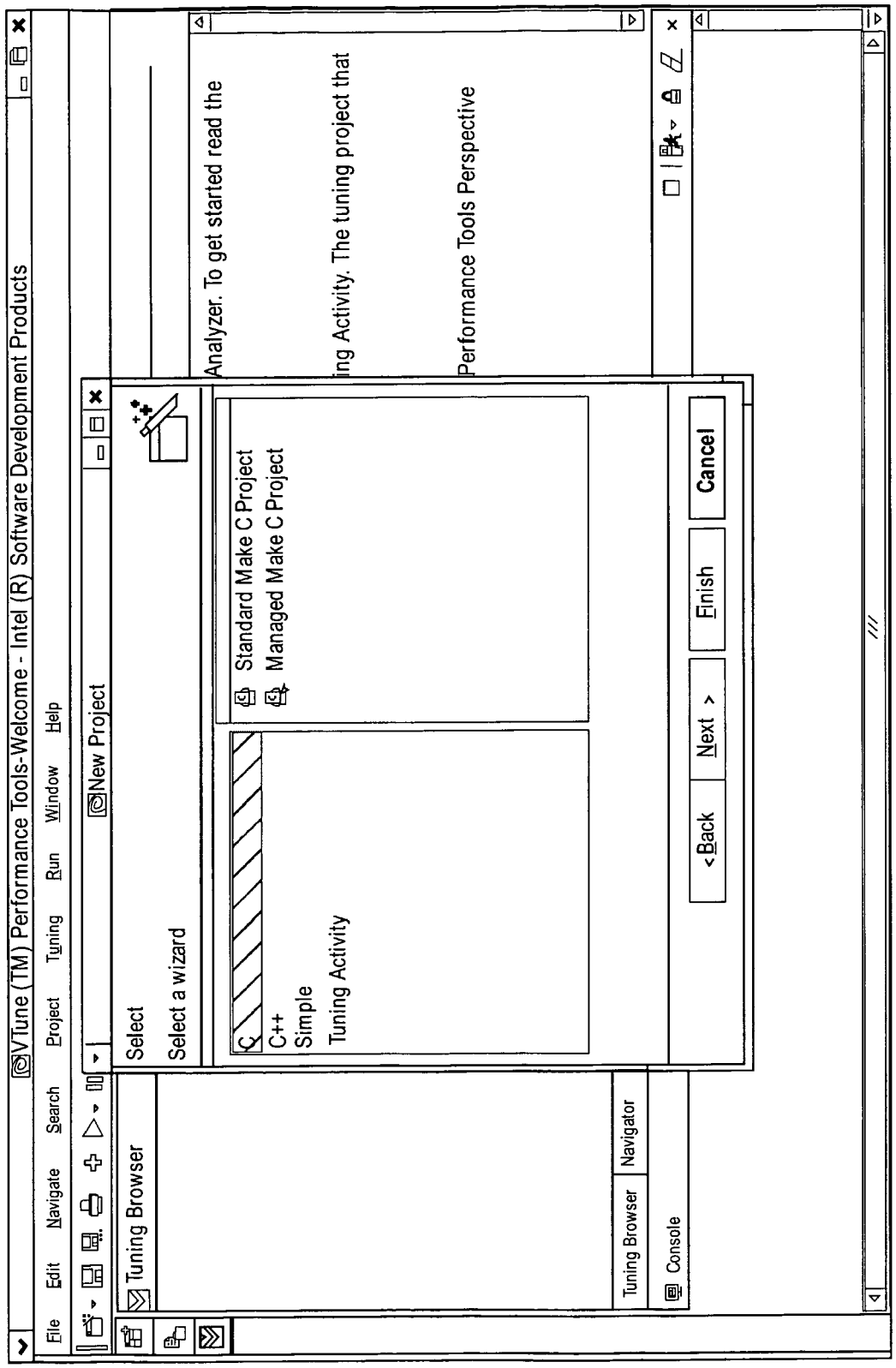
FIG. 4 is an example display of the GUI of an application program captured during a playback phase.
Figure 5:
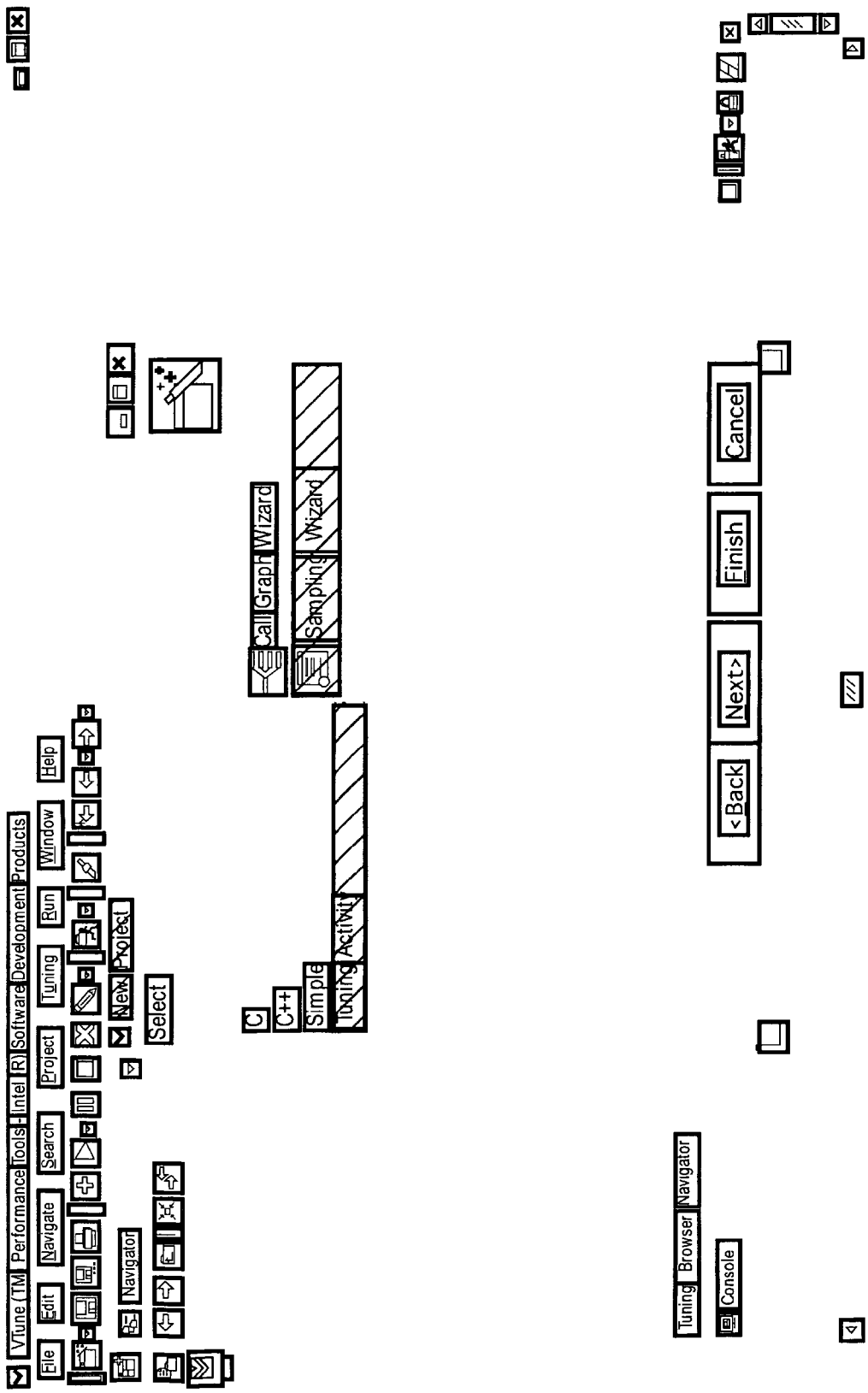
FIG. 5 is an example image illustrating objects identified during contouring operations of the recording phase according to an embodiment of the present invention.
Figure 6:
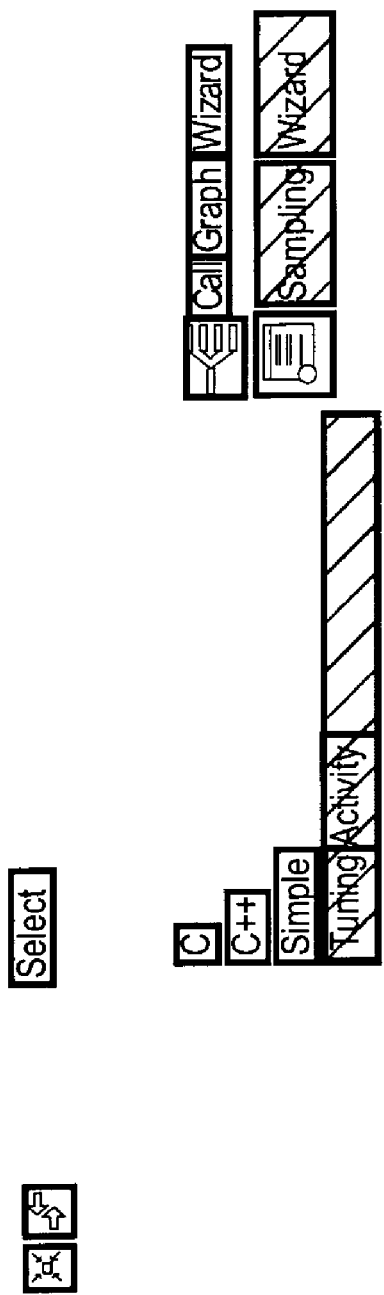
FIG. 6 is an example image illustrating objects of activity of the recording phase according to an embodiment of the present invention.
Figure 7:
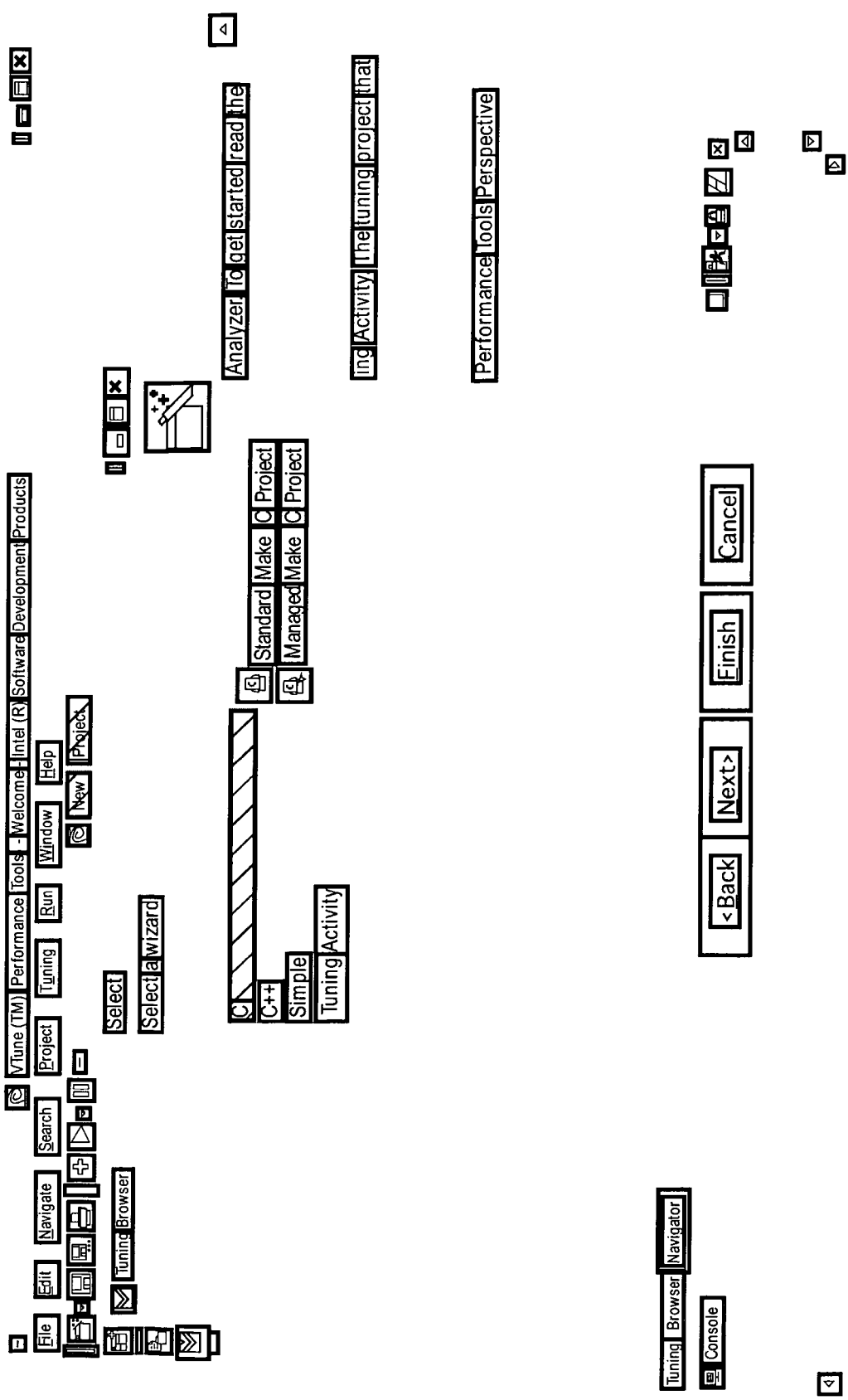
FIG. 7 is an example image illustrating objects identified during contouring operations of the playback phase according to an embodiment of the present invention.
Figure 8:
FIG. 8 is an example image illustrating a hypothesis during the playback phase according to an embodiment of the present invention.
Figure 8:
Figure 8:
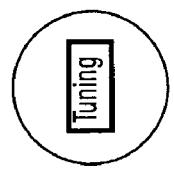
Figure 8:
Figure 8:

Embodiments of the present invention including image analysis and object of activity detection on two images may be illustrated by the following examples using a performance analyzer application program. These figures show applying the process blocks of FIG. 2 to a first image from the recording phase (IR) and a corresponding image from the playback phase (IP). FIG. 3 is an example display of the GUI of an application program captured and saved during a recording phase. This IR screen shot shows that the item "Tuning Activity" was selected by the user using a mouse. FIG. 4 is an example display of the GUI of an application program captured during a playback phase. Note there are some insignificant changes in the displayed windows in comparison to FIG. 3. FIG. 5 is an example image illustrating objects identified during contouring operations of the recording phase according to an embodiment of the present invention as performed on the image of FIG. 3. FIG. 5 shows the sample output from block 200 of FIG. 2. FIG. 6 is an example image illustrating objects of activity of the recording phase according to an embodiment of the present invention as performed on the image of FIG. 5. These contours were identified after performing blocks 202 and 204 of FIG. 2 on the image from FIG. 5. The contour with the text labeled "Tuning" has been determined in this example to be the current object of activity. FIG. 7 is an example image illustrating objects identified during contouring operations of the playback phase according to an embodiment of the present invention. This image is output from performing block 206 of FIG. 2 on the sample image of FIG. 4. Finally, FIG. 8 is an example image illustrating a hypothesis during the playback phase according to an embodiment of the present invention. FIG. 8 shows hypotheses from FIG. 7 for the "Tuning Activity" object of activity from FIG. 6. Size, space, content, and structural filtration of blocks 206-214 has been performed. The ellipse represents the contour which was selected as the best hypothesis from performing block 216 of FIG. 2. A new point for the mouse click is recalculated relative to the given object (i.e., the "tuning" display object).

Embodiments of the present invention provide at least several advantages. One benefit is that the present approach is applicable to any application program exposing a GUI on any platform and OS, and is not dependent on a specific application programming interface (API) or architecture of visual system implementation and OS specifics. In contrast, existing prior art systems are dependent on system APIs while working with visual elements. Another benefit is that the present approach uses a structured representation of images and objects so it makes the execution stable with respect to visual properties that could change (such as screen resolution, drawing schemes and changes in data values, shapes, and orders). This allows one execution scenario (set to a specific image resolution, visual scheme, OS, and computer system) to be run on many different computer systems that could have different visual configurations and operating systems. Existing systems that claim to use image recognition techniques are dependent on the screen resolution and/or drawing schemes. Also, such systems have strong dependencies on the OS resident in those systems.

Another benefit is that the present system includes paramerization that supports flexibility and extensibility. A number of conditions and specific processes used may be easily changed to allow the CCF system to work for objects represented by contours of different shapes, more strict or flexible time conditions, or more strict or flexible object sizes and different layout requirements. Embodiments of the present invention allow the system to adapt to specific application program family and use cases. For example, while using this system as a test framework, on can ensure that each action completed within the required time limits and easily detect performance degradation. Thus, embodiments of the present invention may be used for capturing and simulating a user interacting with an application program, and thus may be useful for developing new GUIs.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Although the operations detailed herein may be described as a sequential process, some of the operations may in fact be performed in parallel or concurrently. In addition, in some embodiments the order of the operations may be rearranged without departing from the scope of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A computer-implemented method of automatically controlling execution of an application program by a computer system, the application program having a graphical user interface for displaying information on a display coupled to the computer system comprising:
    learning an input action performed by a user while the user is using the application program and its graphical user interface during a recording phase of executing the application program by the computer system;
    capturing images displayed by the graphical user interface in response to the input action being learned during the recording phase;
    analyzing the user input action being learned and the resultant displayed images to generate an execution scenario script during the recording phase, wherein the learned input action and captured images are to be stored in a memory;
    generating simulated user input action based on the execution scenario script during a playback phase of executing the application program by the computer system and inputting the simulated user input action to the application program;
    performing image analysis on images displayed by the graphical user interface on the display as a result of processing the simulated user input action during the playback phase and captured displayed images from the recording phase;
    checking recorded time conditions in the execution scenario script to handle variations in playback speed, and automatically controlling execution of the application program by the computer system based at least in part on the image analysis.

2. The method of claim 1, wherein, performing image analysis further comprises comparing the displayed images captured during the recording phase with displayed images from the playback phase to detect an object to which the user applied the input action during the recording phase, finding the corresponding object in a displayed image from the playback phase, and applying the input action to the found corresponding object.

3. The method of claim 1, wherein the user input action comprises at least one of keyboard input action and mouse input action.

4. The method of claim 3, wherein learning the input action during the recording phase comprises registering and capturing the input action performed by the user.

5. The method of claim 1, wherein the execution scenario script comprises a script including extended markup language (XML) tags.

6. The method of claim 1, wherein analyzing the captured user input data and displayed images during a recording phase comprises:
    determining contours of objects shown in a displayed image;
    detecting an object of activity from among the objects; and
    detecting additional objects located adjacent to the object of activity.

7. The method of claim 1, wherein performing image analysis comprises determining contours of objects in an image displayed by the graphical user interface during the playback phase and filtering the objects according to size to produce a set of hypotheses for active objects.

8. The method of claim 7, wherein performing image analysis further comprises filtering objects according to space layout to produce a first subset of hypotheses for active objects.

9. The method of claim 7, wherein performing image analysis further comprises filtering objects by content to produce a second subset of hypotheses for active objects.

10. The method of claim 7, wherein performing image analysis further comprises structural filtering of objects to produce a best hypothesis for an active object.

11. The method of claim 7, wherein performing image analysis further comprises recalculating old actions for a new object identified as the active object.

12. A non-transitory computer readable medium comprising instructions, which when executed, result in automatically controlling execution of an application program by a computer system, the application program having a graphical user interface for displaying information on a display coupled to the computer system by
    registering and capturing an input action performed by a user while the user is using the application program and its graphical user interface during a recording phase of executing the application program by the computer system;
    capturing images displayed by the graphical user interface in response to the input action performed by the user during the recording phase of execution of the application program by the computer system;
    analyzing the registered and captured user input action and responsively displayed images to generate an execution scenario script during the recording phase;
    generating a simulated user input action based on the execution scenario script during a playback phase of execution of the application program by the computer system and inputting the simulated user input action to the application program;
    performing image analysis on images displayed by the graphical user interface on the display as a result of processing the simulated user input action during the playback phase and captured displayed images from the recording phase;
    checking recorded time conditions in the execution scenario script to handle variations in playback speed, and automatically controlling execution of the application program by the computer system based at least in part on the image analysis.

13. The non-transitory computer readable medium of claim 12, wherein instructions for performing image analysis comprise instructions for comparing the displayed images captured during the recording phase with displayed images from the playback phase.

14. The non-transitory computer readable medium of claim 12, wherein the user input action comprises at least one of keyboard input action and mouse input action.

15. The non-transitory computer readable medium of claim 12, wherein instructions for analyzing the registered and captured user input action and responsively displayed images in the recording phase comprise instructions for identifying actions of the application program corresponding to the registered and captured user input action.

16. The non-transitory computer readable medium of claim 12, wherein the execution scenario script comprises a script including extended markup language (XML) tags.

17. The non-transitory computer readable medium of claim 12, wherein instructions for analyzing the captured user input data and displayed images during a recording phase comprise instructions for:
   determining contours of objects shown in a displayed image;
   detecting an object of activity from among the objects; and
   detecting additional objects located adjacent to the object of activity.

18. The non-transitory computer readable medium of claim 12, wherein instructions for performing image analysis comprise instructions for determining contours of objects in an image displayed by the graphical user interface during the playback phase and filtering the objects according to size to produce a set of hypotheses for active objects.

19. The non-transitory computer readable medium of claim 18, wherein instructions for performing image analysis further comprise instructions for filtering objects according to space layout to produce a first subset of hypotheses for active objects.

20. The non-transitory computer readable medium of claim 18, wherein instructions for performing image analysis further comprise instructions for filtering objects by content to produce a second subset of hypotheses for active objects.

21. The non-transitory computer readable medium of claim 18, wherein instructions for performing image analysis further comprise instructions for structural filtering of objects to produce a best hypothesis for an active object.

22. The non-transitory computer readable medium of claim 18, wherein instructions for performing image analysis further comprise instructions for recalculating old actions for a new object identified as the active object.

23. A cognitive control framework system for automatically controlling execution of an application program having a graphical user interface in a computer system comprising:
   a recording component adapted to register and capture user input actions and capture images displayed by the graphical user interface as a result of the user input actions during a recording phase of execution of the application program, and to analyze the registered and captured user input actions and captured resultant displayed images to generate an execution scenario script during the recording phase,
   a playback component adapted to generate simulated user input actions based on the execution scenario script during a playback phase of execution of the application program, to input the simulated user input actions to the application program, to perform image analysis on images displayed by the graphical user interface as a result of processing the simulated user input actions during the playback phase and captured displayed images from the recording phase; checking recorded time conditions in the execution scenario script to handle variations in playback speed, and to automatically control execution of the application program by the computer system based at least in part on the image analysis.

24. The system of claim 23, wherein the playback component is adapted to compare the displayed images captured during the recording phase with displayed images from the playback phase.

25. The system of claim 23, wherein the recording component is adapted to identify actions of the application program corresponding to the registered and captured user input actions.

* * * * *